Patented Aug. 6, 1940

2,210,043

UNITED STATES PATENT OFFICE 2,210,043

COMPOSITION FOR GREASING BAKING PANS AND THE LIKE

Samuel Scherr, Baltimore, Md.

No Drawing. Application October 21, 1938, Serial No. 236,327. Renewed December 9, 1939

5 Claims. (Cl. 99—123)

This invention relates to compositions for greasing baking pans and the like, and has particular reference to compositions of this character which may be applied mechanically or by hand.

The customary practice in bakeries consists in melting lard, or other shortening and greasing the pans therewith and in some instances wheat flour is dusted on the greased pans. A variation of this practice consists in mixing a quantity of flour with the shortening before application of the greasing mixture to the pans. Furthermore, neither of these methods is more than partially effective in overcoming the tendency of the baked goods to stick, and, in case of baked products, such as Danish pastries, it has been necessary to employ metal scrapers to pry such baked products loose from the pans, with consequent breakage and damage to much of the products. A further disadvantage of these prior methods is that this sticking to the pans promotes caramelization and charring of the crust, thus adding further to the labor of cleaning the pans before re-use.

It is the general object of the invention to improve and facilitate the practice in greasing pans.

Among the objects of this invention is to provide a composition for greasing baking pans and the like which overcomes the disadvantages above noted in the prior processes and prior greasing mixtures. My new greasing composition possesses, in addition, other valuable properties which are absent in prior mixtures employed for this purpose.

A further object of this invention is to provide a composition for greasing baking pans and the like which possesses greater efficiency and is more economical in use than prior mixtures of this type.

A still further object of this invention is to provide a greasing composition for baking pans and the like that is suitable for cakes, bread, pastries, etc. and which leaves the pans or other baking devices practically free from adhering crust after the baked goods are removed therefrom, thereby effecting a considerable saving in the amount of time normally employed in removing incrustations from the pans before regreasing for re-use.

A further object of this invention is to provide a greasing composition which can also be employed for greasing dough troughs and dough dividers and which can be satisfactorily employed wherever an edible lubricant is brought in contact with foodstuffs.

Another object of the invention is the spraying of a greasing composition with ordinary liquid spray apparatus, so that pans of various sizes and shapes may be quickly and efficiently greased.

Other, further and more specific objects of this invention will become readily apparent to persons skilled in the art from a consideration of the following description.

With the prevalence of large scale baking wherein operations are largely conducted by machinery, cake pans and the like are commonly greased by hand. The sticking of baked goods to pans is more particularly a problem where cakes and sweet goods are produced, the sugar content of which is subject to caramelization. Difficulty has been experienced in producing a machine or machine process. One difficulty is variation in size and shapes of pans. One proposed solution is the use of a solid fat in powder form to be blown as such onto the pans, with or without admixture of flour or starch. Highly hydrogenated oil or fat has been so suggested, but so far as personal knowledge is concerned has never been used. One difficulty would be in securing sufficiently thick films for the purposes desired. One objection to it is the high melting point or high stearine content, the hard fat being more indigestible than the shortening fats and oils. It is also more expensive.

I have tried to use liquid spraying apparatus for known pan greases and have found this to be impossible. These are either fat alone, or fat and flour. Attempts to spray melted fat for solidification on the pan require the impractical features of heating the apparatus, hose and nozzle. Where a fat, either an oil or a mixed plastic shortening and oil, has normally a fluidity to permit spraying without danger of solidifying in unheated spray equipment, it is too fluid for the vertical sides of pans and runs down therein, making too much on the bottom and not enough on the sides. Where compositions with flour were used, the defect is remedied so far as covering pans is concerned, but present the problem of separation. On standing the flour gummed, clogging the apparatus. In addition variable compositions were discharged because of the separation. However, where starch is used, both problems are overcome. A very small percentage of starch is sufficient for these purposes, such as 1 part of starch to 15 of fat vehicle. However, for the additional problem of avoiding sticking to the pan of baked goods having a high content of sugar, I prefer at least 2 parts or more of starch to 15 parts of fat vehicle.

However, I have been able to devise a composition of fat and starch which is capable of being sprayed without the use of heating elements on the spraying apparatus, and without the use of mechanical agitators to keep the composition in a state suitable for use. I have discovered that starch is distinctly different from flour when mixed in a given fat, in being relatively stable against settling, and gumming, or lumping, like flour having gluten therein. As a result of using starch in place of gluten, I have discovered the cause of sticking of bakery goods to greased pans.

Of course greasing is done to avoid sticking, but this is not fully accomplished. I have discovered that it is the gluten content of flour that causes sticking. The grease on a pan is to form an insulating film to avoid contact of the gluten or the sugar content of the dough with the pan. The use of flour in a pan grease effects only exclusion of the sugar content of the dough, and increases the contact of its own gluten to the pan. With my composition the starch effectively insulates the gluten and the sugar from the pan. Therefore a large quantity of starch in the composition is desirable and may readily be obtained up to 50% or more.

In carrying out the invention in practice an edible fat is used, whether animal or vegetable, or mixed, or natural or synthetic or mixed therebetween, as in the case of hydrogenated products. The latter include partially or completely hydrogenated oils or fats. As a rule hydrogenation increases the solidity or solidification temperature of a fat. Stearine is an example of a completely hydrogenated product melting at about 130° F. Certain vegetable shortenings on the market today are hydrogenated cotton seed oil. This, like other commercial fats, is a mixture of various ingredients having a range of individual solidification points. It is common to use mixed fats or to mix them for desired purposes. For special results it is easier to compound a fat mixture than to look about for a commercial product which may serve the purpose.

I desire a pan grease which remains soft or plastic but not too fluid at ordinary temperatures of from 60° F. to 90° F. for such temperature as is encountered in the bakery at the greasing station. This may vary generally with the latitude and the seasons, and specifically with different bakeries. The invention is flexible in being adaptable to variation to suit particular conditions. Thus I prefer to compound the mixture in various grades for such varying conditions of use. I do not herein illustrate all the grades which are contemplated as falling within the invention, nor do I intend it to be understood that every example is universally suitable. Each example is suitable for some condition, and it is well within the skill of the art to follow the dictates of this disclosure and make useful variations thereof.

I have found that the common shortenings that are plastic at 70° F. are too solid for use in the present invention. Fats which at 70° F. are oils, such as cotton seed oil, are too fluid for the present invention. Mixtures of the shortening and starch, or of the oil and starch, are respectively too thick or too thin for use as a pan grease suitable for a spraying machine. Mixtures of shortening and oil are suitable for combining with starch. Where a high content of starch is used, the oil is increased at the expense of shortening, the starch and the shortening both having a thickening effect.

The following compositions (parts by weight) are illustrative:

| Example | Corn starch | Cottonseed oil | Vegetable shortening |
|---|---|---|---|
| 1 | 5 | 8 | 4 |
| 2 | 5 | 4 | 8 |
| 3 | 12 | 10 | 2 |
| 4 | 5 | 6 | 6 |
| 5 | 5 | 9 | 6 |
| 6 | 2 | 9 | 6 |
| 7 | 1 | 7 | 8 |

In the above the vegetable shortening is one having the consistency of butter, lard, and partially hydrogenated cotton seed oil melting at from 85° F. to 95° F. It may be substituted by lard or other edible fats of like consistency, such as those prepared from soy bean oil, peanut oil, sesame oil, sunflower seed oil, coconut oil and the like.

Cotton seed oil in the above examples may be substituted by other animal or vegetable oils which are oils at 70° F., such as corn oil, soy bean oil, peanut oil, sesame oil, sunflower seed oil, or low hydrogenation products thereof.

The corn starch may be substituted by starches such as potato starch, tapioca, sage, rice and others, even wheat, where the gluten is absent. The starch grains are preferred, but the dry gelatinized starches, or dried broken grains are suitable. Gelatinized corn starch makes a thicker-bodied mixture than an equivalent of ordinary corn starch.

I do not limit the invention to use of pure starch. For example dextrinized starch may be used. This is a form of starch in which a portion has been dextrinized, say 50% to 65%, the remainder being starch. It is equally absorbent if not more absorbent of oil because of the dextrinization. However, it is more expensive. It has the same empyrical formula as starch and although it is starch chemically altered in the direction of sugar, it is not sugar and is not subject to caramelization. Dextrin is soluble in water, and hence all dextrin is not desirable because of danger of being taken up by the dough. Where dextrinized starch is used, the desired starch film will be left.

Example 1 is the preferred form as it is useful in winter and summer. Example 2 is particularly useful in summer. It is to be noted that the proportions of oil and shortening in Examples 1 and 2 are reversed, giving Example 2 a heavier consistency than Example 1 for use at higher temperatures.

Example 3 illustrates equal portions of starch and fat vehicle, shortening being low and the oil high because of the thickening effect of the heavy starch content.

In making up the composition the shortening and oil are blended and preferably brought to the normal bakery temperature. Then the starch is mixed into it. This procedure is important to obtain the desired consistency for which the formula is designed. It has been found that if the vehicle is heated and starch is added, or if the formulated compound is heated, both cases, on cooling show a slight tendency to separate. This is believed to be due to the heat first dissolving the solidified ingredient of the mass, then on cooling, the same ingredient solidifies on or in the starch particle, leaving a residual vehicle more oily than the original blended fats. However, the tendency to separate is not bad, and separation is slow. The starch is readily suspended again with but slight agitation. It has also been found that where flour is used in place of starch, the same tendency to separation exists, but the flour so separated is more gummy and lumpy, with a tendency to pack. The settled flour does not lend itself readily to redistribution.

Therefore for using liquid spray apparatus, a composition with flour cannot be left overnight for example and redistributed by simple agitation. The starch and fat composition are more comparable to paints wherein the pigment is readily stable against separation and readily dispersed. By using starch and fat according to this invention compounded in the preferred manner, no trouble is experienced in using the composition as a spray, and in leaving it in the apparatus for use at a later period. We may originally compound it without heat where it is to be kept on hand. Thereby it settles less. However, in using it as a spray we have found that it becomes more fluid for such use if heated and cooled. It may be prepared with heat and used hot in spray equipment, but if so, it does not cause trouble by solidifying and separating in the spray apparatus when it may cool therein. This is of great practical importance.

The composition is not limited to use in spraying equipment. It is advantageous in baking, however applied, in view of the absence of gluten. It is useful for hand application because of its stability and its consistency. However, it is of great value because it does permit use of unheated spraying equipment and the successful use of mechanical spraying as a method of application. Compositions as described may be prepared and stored under normal commercial conditions without change. Cold does not alter them. Ordinary heat of summer or warehouses does not harm them.

The present invention is not limited to the specific details set forth in the foregoing examples which should be construed as illustrative and not by way of limitation, and in view of the numerous modifications which may be effected therein without departing from the spirit and scope of this invention it is desired that only such limitations be imposed as are indicated in the appended claims.

The present application is a continuation-in-part of my earlier application Serial No. 146,309, filed June 3, 1937.

I claim:

1. A composition suitable for greasing baking pans for baked goods and pastries comprising 1 to 5 parts of a starchy powder free from gluten selected from the group consisting of starch, gelatinized starch, and dextrinized starch, and from 5 to 15 parts of edible fat selected from the group consisting of animal fat, vegetable fat and their hydrogenation products, said fat consisting of a liquid oil at 70° F. and a plastic shortening at 70° F. in the proportion of 2 to 5 parts of oil to 1 to 4 parts of shortening, the proportions being selected to provide in combination with the powder a composition which is neither liquid nor solid, yet is flowable at the temperature of use in a bakery such as to permit of mechanical spraying as a fluid, being stable against irreversible separation and being smooth and free from lumps.

2. A composition suitable for greasing baking pans for baked goods and pastries comprising 1 to 5 parts of corn starch free from gluten and from 5 to 15 parts of edible fat selected from the group consisting of animal fat, vegetable fat and their hydrogenation products, said fat consisting of cottonseed oil and shortening which is plastic at 70° F. in the proportion of 2 to 5 parts of oil to 1 to 4 parts of shortening, the proportions being selected to provide in combination with the powder a composition which is neither liquid nor solid, yet is flowable at the temperature of use in a bakery such as to permit of mechanical spraying as a fluid, being stable against irreversible separation and being smooth and free from lumps.

3. A composition suitable for greasing baking pans for baked goods and pastries comprising 5 parts of corn starch free from gluten, 8 parts of cottonseed oil and 4 parts of shortening which is plastic at 70° F.

4. A composition suitable for greasing baking pans for baked goods and pastries comprising 2 to 5 parts of a starchy powder free from gluten selected from the group consisting of starch, gelatinized starch, and dextrinized starch, and from 5 to 15 parts of edible fat selected from the group consisting of animal fat, vegetable fat and their hydrogenation products, said fat consisting of a liquid oil at 70° F. and a plastic shortening at 70° F. in the proportion of 2 to 5 parts of oil to 1 to 4 parts of shortening, the proportions being selected to provide in combination with the powder a composition which is neither liquid nor solid, yet is flowable at the temperature of use in a bakery such as to permit of mechanical spraying as a fluid, being stable against irreversible separation and being smooth and free from lumps.

5. The method of greasing baking pans for bakery goods which comprises mechanically spraying onto the pans a flowable composition according to claim 1.

SAMUEL SCHERR.